(No Model.)
O. B. KINNARD.
FRICTION CLUTCH.
No. 438,733. Patented Oct. 21, 1890.
Fig. 1. Fig. 2.
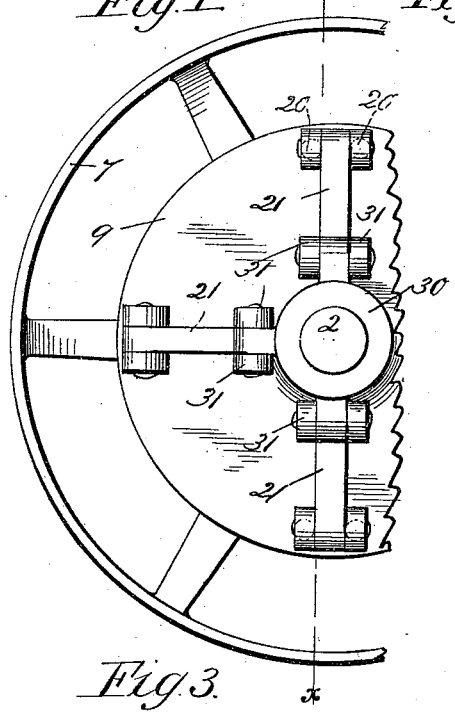
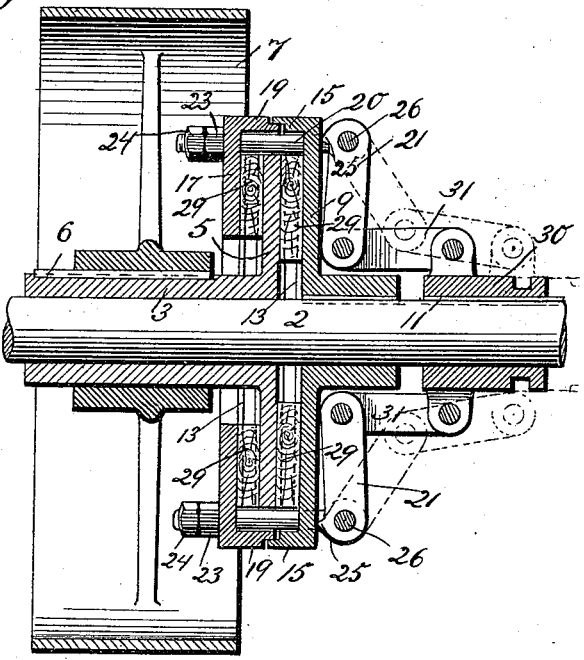
Fig. 3. Fig. 4.
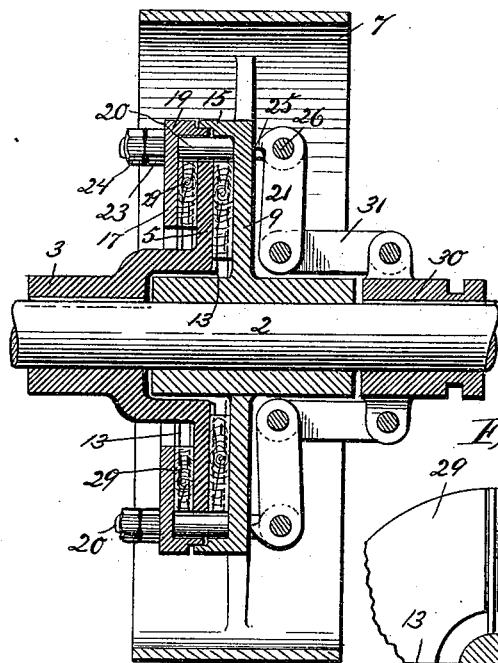
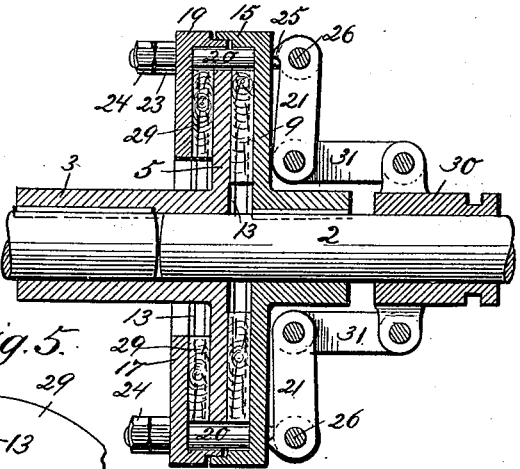
Fig. 5.
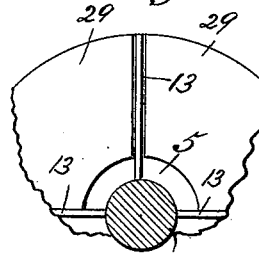
Witnesses
J. Jessen
O. E. Hawley
Inventor
Owen B. Kinnard
By Paul & Mervin attys

UNITED STATES PATENT OFFICE.

OWEN B. KINNARD, OF MINNEAPOLIS, MINNESOTA, ASSIGNOR TO THE KINNARD PRESS COMPANY, OF SAME PLACE.

FRICTION-CLUTCH.

SPECIFICATION forming part of Letters Patent No. 438,733, dated October 21, 1890.

Application filed April 5, 1890. Serial No. 346,688. (No model.)

*To all whom it may concern:*

Be it known that I, OWEN B. KINNARD, of Minneapolis, in the county of Hennepin and State of Minnesota, have invented certain Improvements in Friction-Clutches, of which the following is a specification.

My invention relates to means for rotating a loose pulley with a shaft by means of a clutch secured to such shaft or coupling two shafts or parts of shafts together; and the invention consists, generally, in providing a sleeve to which is secured the pulley or part to be rotated, and having secured thereto a disk forming a flange at right angles thereto, with two clamping-disks having their inner surfaces faced with wooden friction-blocks and loosely secured together by means of bolts extending through them just outside of the periphery of the sleeve-disk, and suitable mechanism adapted to press the two friction-disks toward each other and against the sleeve-disk controlled and operated by being secured to a sliding collar moving upon a spline in the shaft.

The invention further consists in the construction and combination hereinafter described, and particularly pointed out in the claim.

In the drawings forming part of this specification, Figure 1 is a partial end elevation of my improved friction-clutch. Fig. 2 is a section on line $x\,x$ of Fig. 1. Fig. 3 is a section similar to Fig. 2, but showing a different pulley. Fig. 4 is a section showing an arrangement for coupling two shafts together. Fig. 5 is a detail.

In the drawings, 2 represents a shaft, upon which is loosely journaled the sleeve 3, having the disk-flange 5, preferably constructed integrally therewith. Upon the sleeve 3 is secured in any suitable manner, as by a spline 6, the wheel or pulley 7. Upon the shaft 2 is secured the friction-disk 9, the inner surface being provided with a series of radial ribs 13. Upon the periphery of the disk 9 is an inwardly-extending flange 15, which is adapted to overlap the sleeve-disk 5. On the other side of the sleeve-disk 5 is arranged a disk 17, also provided with radial ribs 13, and a peripheral flange 19, adapted to slide within the flange 15 of the other disk, said inner disk 17 being secured loosely to the outer disk 9 by means of a series of bolts 20, passing through both near their peripheries and outside the sleeve-disk 5. Both the disks 9 and 17 are provided with friction-blocks 29, preferably constructed of wood, and secured to said disks between said radial ribs. The bolts 20 are preferably arranged in pairs, each pair being so arranged that a lever 21 may be pivotally secured between the heads of the bolts by a pin or bolt 26, passing through said lever 21, and the head of a bolt on each side thereof. Each bolt is provided with an adjusting-nut 23 and a lock-nut 24. The lever 21 is provided with a cam projection 25 arranged thereon, so that when said lever is in a position, as shown in Fig. 2, perpendicular to the shaft 2 the cam projection 25 is directly between the pivot 26 and the disk 9, in which position the desired amount of friction between said friction-disks 9 and 17 and the sleeve-disk 5 may be accurately adjusted by means of the adjusting-nuts 23. When the collar is moved so as to bring the parts into the position indicated by dotted lines in Fig. 2, the friction will be removed from the disk 5, and when the collar is moved so as to carry the cam-levers beyond the dead-center, as shown by the full lines in the same figure, the two outer disks will be locked upon the sleeve-disk 5. When the lever 21 has been thrown inward past the perpendicular line from the pivot 26 to the shaft 2, the cam projection 25 is past its center, thereby securely fastening and locking all parts hereinbefore described together, when, as the shaft 2 is rotated, carrying with it the outer disk 9, all the other parts, including the loose pulley 7, are rotated also.

Upon the shaft 2 is secured the sliding collar 30, adapted to slide longitudinally upon the spline 11. The collar 30 is connected to the several levers 21 by means of the arms 31, pivotally secured to said collar and said levers, so that as the collar 30 is pushed toward the disk 9 the disk 17 is drawn toward the disk 9 by means of the cam on the lever 21 striking against the disk 9, thereby gripping the inclosed sleeve-disk 5, which carries the pulley 7, and releasing them from engagement with said disk 5 when said collar is withdrawn from said disk 9. Either the disk 9 or the sleeve 3 should have a slight longitudinal movement on the shaft to permit an equal friction upon both surfaces of the disk 5.

The advantage of a friction-clutch provided with wooden friction-blocks is apparent, a much greater friction being more easily obtained thereby, and the wooden blocks being easily and cheaply replaced by new ones when worn out. This improved friction-clutch will last longer and stand more service, and, being so simple, can be manufactured much cheaper than if made of metal entirely.

While I prefer to use the wooden friction-blocks and specific construction hereinbefore set forth, this friction-clutch may be constructed without the wooden friction-blocks without departing from my invention by merely forming the portion of the disks 9 and 17 occupied by the wood in the construction hereinbefore described of metal.

The pulley 7 may, if preferred, be secured upon the disk 9, said disk and the collar being loose on the shaft, and the sleeve-disk 5 be secured to the shaft, as shown in Fig. 3; or the sleeve-disk 5 may be secured upon one shaft and the disk 9 upon another, as shown in Fig. 4, and thereby the two shafts may be locked together. Either the disk 9 or the disk 5 is in this instance capable of a slight longitudinal movement on its shaft.

I claim as my invention—

The combination, with a rotating shaft, of the sleeve 3, provided with a flange-disk 5, the clamping-disks 9 and 17, provided with overlapping flanges 15 and 19 and arranged to embrace said disk 5, and provided with radial ribs and with wooden friction-blocks between said ribs, the adjustable bolts 20 arranged in pairs and extending through said disks 9 and 17 outside of said disk 5, the transverse pins 26, secured in said bolts 20, the cam-levers 21, pivotally mounted on said pins 26 and adapted to bear upon the face of the disk 9, the sliding collar, and the arms 31, connecting said levers with said sliding collar, substantially as described.

In testimony whereof I have hereunto set my hand this 27th day of February, 1890.

OWEN B. KINNARD.

In presence of—
A. C. PAUL,
A. M. GASKILL.